H. W. MAURER.
DEVICE FOR ATTACHING THERMOMETERS TO TANKS, VATS, OR THE LIKE.
APPLICATION FILED MAR. 18, 1908.
899,313.
Patented Sept. 22, 1908.
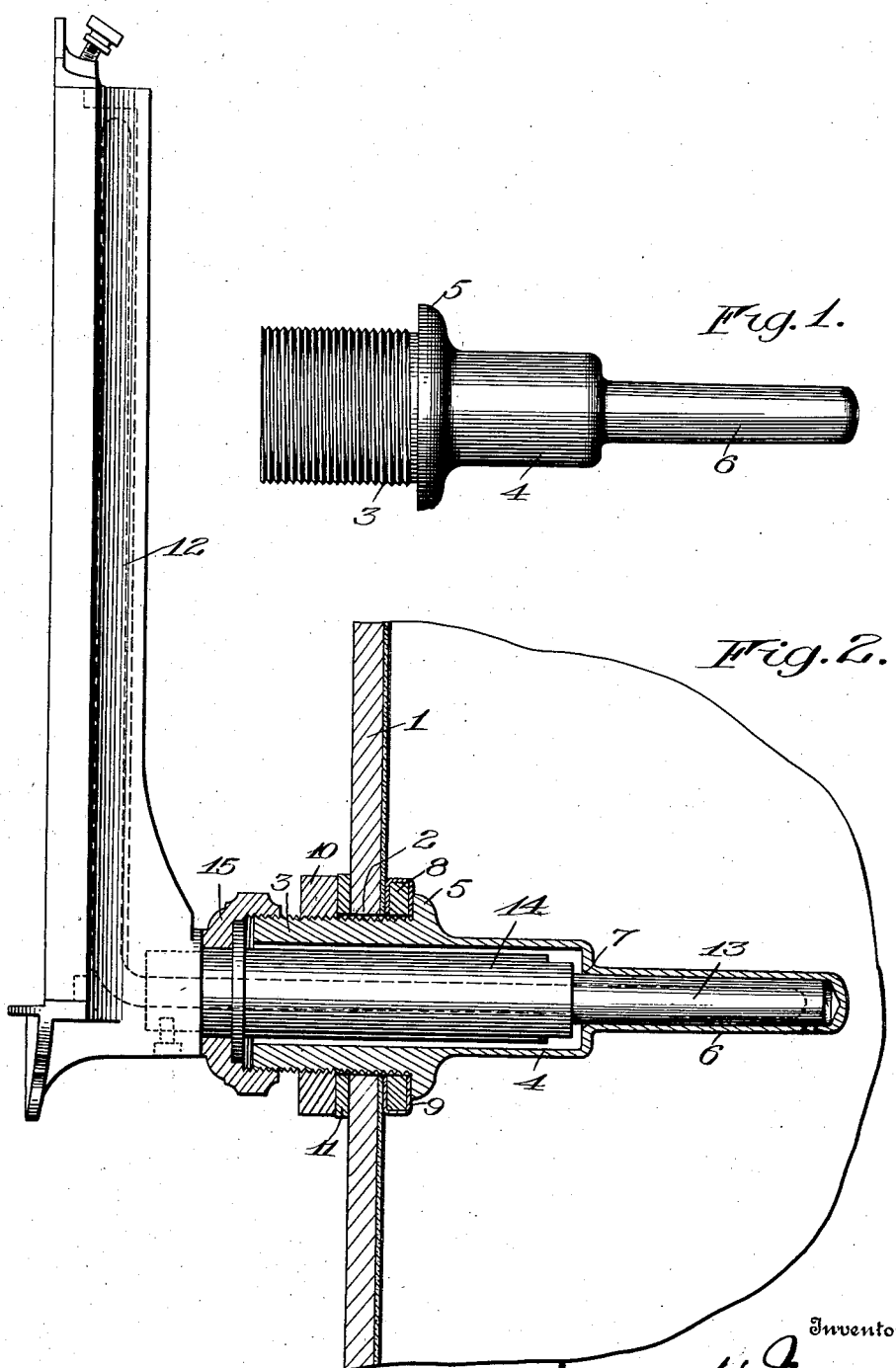

UNITED STATES PATENT OFFICE.

HENRY W. MAURER, OF ROCHESTER, NEW YORK, ASSIGNOR TO THE TAYLOR INSTRUMENT COMPANIES, OF ROCHESTER, NEW YORK, A CORPORATION OF NEW YORK.

DEVICE FOR ATTACHING THERMOMETERS TO TANKS, VATS, OR THE LIKE.

No. 899,313.       Specification of Letters Patent.       Patented Sept. 22, 1908.

Application filed March 18, 1908. Serial No. 421,943.

*To all whom it may concern:*

Be it known that I, HENRY W. MAURER, of Rochester, county of Monroe, and State of New York, have invented certain new and useful Improvements in Devices for Attaching Thermometers to Tanks, Vats, or the Like; and I do hereby declare the following to be a full, clear, and exact description of the same, reference being had to the accompanying drawings, forming a part of this specification, and to the reference-numerals marked thereon.

The present invention relates to devices for attaching thermometers to tanks, vats or the like of the type in which a socket piece projects into the vat or tank, and has the thermometer detachably secured thereto in order that the latter may be removed and applied to socket pieces of other vats or tanks.

An object of the present invention is to form the socket piece in such a manner that all sharp corners or crevices will be eliminated so that particles cannot collect therein, and decay, this result being very desirable when the vat is used for making beer or producing any other food products.

To this and other ends the invention consists in certain improvements and combinations of parts all as will be hereinafter more fully described, the novel features being pointed out in the claims at the end of the specification.

In the drawings: Figure 1 is a side view of the thermometer socket piece, and Fig. 2 is a longitudinal sectional view of the socket piece applied to a vat wall and having the thermometer secured thereto.

Referring more particularly to the drawings 1 indicates a vat wall having a perforation 2 which receives the threaded portion 3 of the socket piece. The socket piece comprises preferably a cylindrical hollow body portion 4 having formed thereon the threaded portion 3 and an annular flange or shoulder 5 at the inner end of the threaded portion. Extending from one end of the body portion is a reduced hollow extension 6 communicating with the hollow body portion, closed at its outer end and having an inner wall tapering toward its outer end, a beveled portion 7 being formed at the inner end of the wall.

When the socket piece is fitted in a perforation in a tank the shoulder 5 abuts a packing ring 8 that is covered with soft metal 9 in order to protect the ring against the contents of the tank. It is held against the packing ring by a nut 10 that coöperates with the threaded portion of the socket piece arranged on the exterior of the tank, a washer 11 being interposed between the nut and the tank.

The thermometer 12 may be of any suitable construction and have a tapering extension 13 inclosing the usual thermometer tube to fit within and contact with the inner wall of the tapering extension 6 of the socket piece, the beveled portion 7 serving to guide the extension 13 into the extension 6. The body portion 4 contains the usual large portion 14 of the thermometer, on which may be journaled an internally threaded nut 15, that coöperates with the projecting part of the threads on the threaded portion 3 of the socket piece. This nut serves to force the exterior wall of the extension 13 into firm contact with the inner wall of the extension 6 and the latter receives the heat from the contents of the tank and communicates it to the thermometer through the extension 13.

The socket piece is made of one piece of material and the corners between the several portions thereof are curved so that no crevices are provided to collect material. The one set of threads serves for securing it to the tank and for holding the thermometer thereto.

A device constructed in accordance with this invention is inexpensive to manufacture and to install. It is sanitary in every respect and is thus adapted for use in beer making and in the production of food products.

I claim as my invention:

1. The combination with a tank wall having a perforation, of a socket piece having an externally threaded portion at its outer end lying in the perforation and an external shoulder arranged on the inner face of the wall, and a nut engaging the threaded portion of the socket on the outer face of the wall, the said threaded portion being extended beyond the nut.

2. The combination with a tank wall having a perforation, of a socket piece having an externally threaded portion at its outer end lying in the perforation and an external shoulder arranged on the inner face of the wall, and a nut engaging the threaded portion of the socket on the outer face of the wall, the said threaded portion being extended beyond the nut, and a thermometer having a portion fitted in said socket piece and an internally threaded nut journaled thereon and engaging the threaded portion of the socket piece projecting beyond the nut that secures the socket piece to the tank wall.

3. A thermometer socket piece for tanks comprising a hollow body portion having a hollow extension at one end formed with a tapering inner wall, an externally screw threaded portion at its other end, and a shoulder on the body portion at the inner end of the screw threaded portion.

HENRY W. MAURER.

Witnesses:
HAROLD H. SIMMS,
RUSSELL B. GRIFFITH.